United States Patent
Kataoka et al.

(10) Patent No.: US 8,489,300 B2
(45) Date of Patent: Jul. 16, 2013

(54) VIBRATION CONTROL APPARATUS FOR AUTOMOTIVE VEHICLE

(75) Inventors: Motoaki Kataoka, Kariya (JP); Toshiki Matsumoto, Kariya (JP); Tsutomu Tashiro, Nagoya (JP); Mamoru Mabuchi, Kariya (JP); Mamoru Sawada, Yokkaichi (JP)

(73) Assignee: DENSO CORPORATION, Kariya (JP)

( * ) Notice: Subject to any disclaimer, the term of this patent is extended or adjusted under 35 U.S.C. 154(b) by 659 days.

(21) Appl. No.: 10/703,596

(22) Filed: Nov. 10, 2003

(65) Prior Publication Data
US 2005/0049761 A1    Mar. 3, 2005

(30) Foreign Application Priority Data
Nov. 19, 2002   (JP) ................... 2002-335230

(51) Int. Cl.
  *B60K 28/16*   (2006.01)
  *G06F 19/00*   (2006.01)
(52) U.S. Cl.
  USPC ............... 701/70; 701/85; 701/37; 701/38; 701/48; 180/197; 73/105; 73/11.04
(58) Field of Classification Search
  USPC ............... 701/38, 29, 36, 70, 78, 1, 85, 50, 701/37, 56, 48; 702/56, 81, 41; 73/146, 105, 73/11.04; 303/122, 136; 318/371; 180/197
  See application file for complete search history.

(56) References Cited

U.S. PATENT DOCUMENTS

| | | | |
|---|---|---|---|
| 5,222,570 A * | 6/1993 | Kawamura et al. | 180/197 |
| 5,282,137 A * | 1/1994 | Suzuki et al. | 701/85 |
| 5,369,581 A * | 11/1994 | Ohsuga et al. | 701/48 |
| 5,532,921 A * | 7/1996 | Katsuda | 701/37 |
| 5,947,221 A | 9/1999 | Taniguchi et al. | |
| 5,960,376 A * | 9/1999 | Yamakado et al. | 702/141 |
| 6,098,592 A | 8/2000 | Hess et al. | |

(Continued)

FOREIGN PATENT DOCUMENTS

| | | |
|---|---|---|
| JP | 57-32032 | 2/1982 |
| JP | 59-23037 | 2/1984 |

(Continued)

OTHER PUBLICATIONS

"Powertrain Control for Active Damping of Driveline Oscillations" by Fredriksson et al.; Vehicle System Dynamics 2002, vol. 37, No. 5; pp. 359-376.
Office Action dated Sep. 30, 2008 in corresponding Japanese patent application No. 2002-335230 (and English translation).

*Primary Examiner* — Ronnie Mancho
(74) *Attorney, Agent, or Firm* — Posz Law Group, PLC

(57) ABSTRACT

An object of the present invention is to execute an optimum control of vibrations due to a driver's operation of an accelerator pedal, steering wheel and brake pedal. The operation instructions are inputted into a vibration calculating means (kinetic model) comprising a vehicle body model, suspension model and tire model. Conventional kinetic model controlled the suspension in order to suppress the vehicle body vibration. However, in the kinetic model of the present invention, the tire vibration due to a change in the engine output is first absorbed by the suspension, whereby a residual vibration which was not be absorbed yet by the suspension is transferred to the vehicle body. The operation inputs are compensated by the three feed-back loops between the outputs of the above-mentioned three portions and input of the tire portion, giving the highest priority on the vehicle body model.

20 Claims, 16 Drawing Sheets

U.S. PATENT DOCUMENTS

| | | | |
|---|---|---|---|
| 6,182,001 B1 * | 1/2001 | Sugai et al. | 701/78 |
| 6,298,294 B1 | 10/2001 | Murata et al. | |
| 6,434,454 B1 * | 8/2002 | Suzuki | 701/29 |
| 6,529,838 B1 * | 3/2003 | Horiuchi et al. | 702/41 |
| 6,725,168 B2 * | 4/2004 | Shiraishi et al. | 702/81 |
| 2001/0044685 A1 * | 11/2001 | Schubert | 701/50 |
| 2002/0091471 A1 * | 7/2002 | Suzuki | 701/29 |
| 2002/0134149 A1 * | 9/2002 | Shiraishi et al. | 73/146 |
| 2004/0068397 A1 * | 4/2004 | Ohsawa | 703/8 |

FOREIGN PATENT DOCUMENTS

| | | |
|---|---|---|
| JP | 3-47444 | 2/1991 |
| JP | A-03-078542 | 4/1991 |
| JP | 9-112329 | 4/1997 |
| JP | 10-54264 | 2/1998 |
| JP | 2001-30728 | 2/2001 |
| JP | A-2002-067636 | 3/2002 |

* cited by examiner

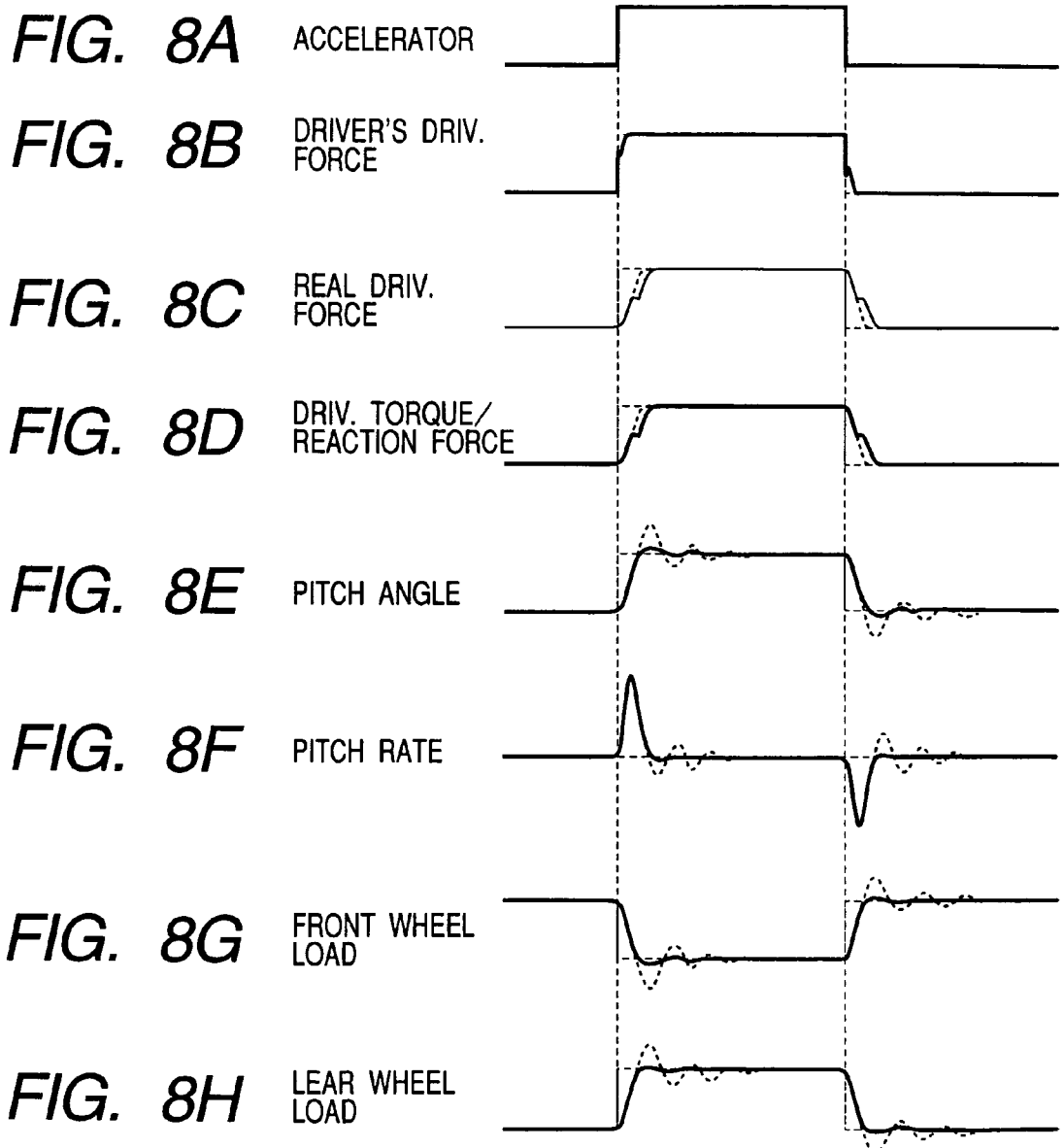

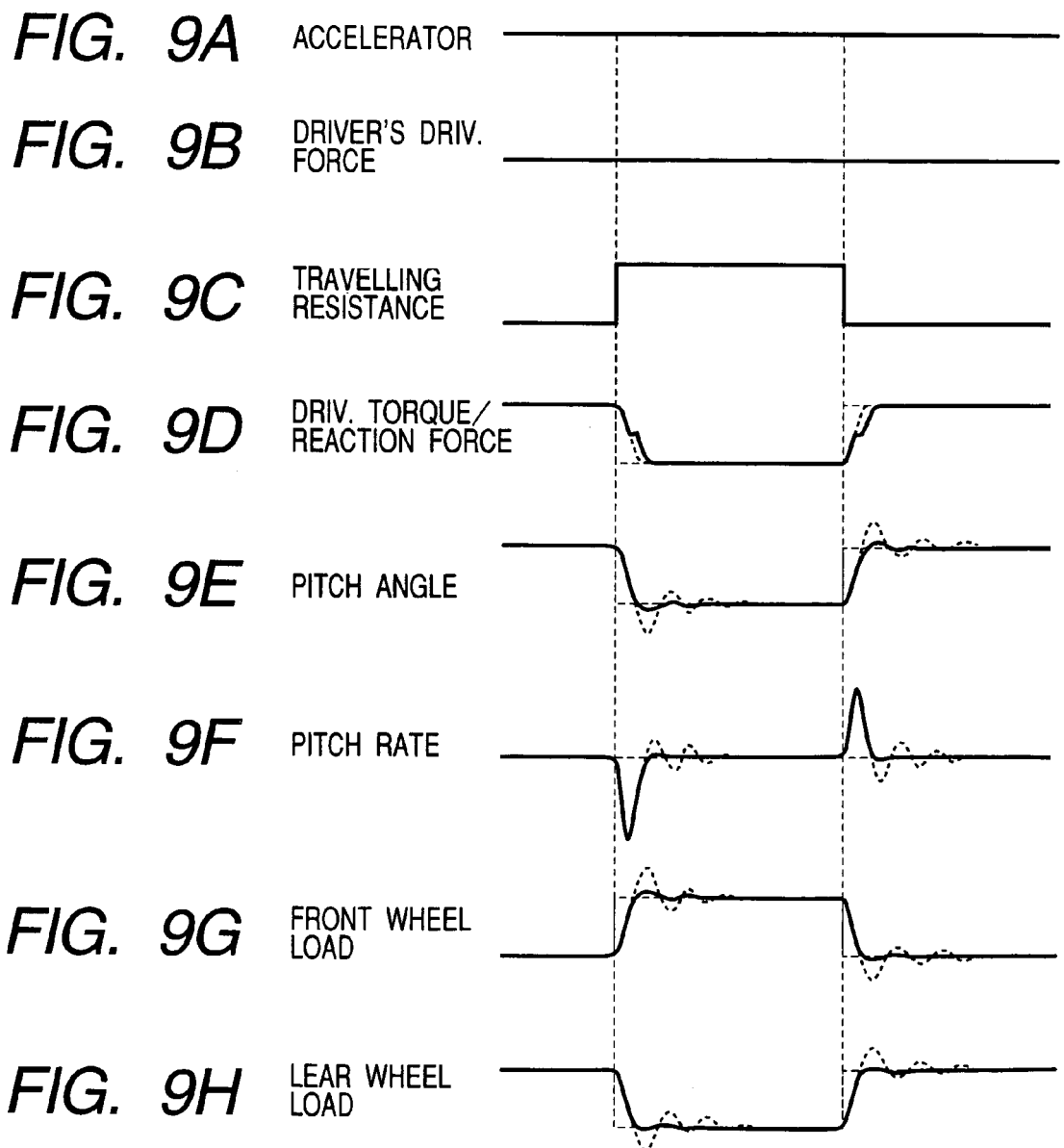

Ipθ" = −1fkf (x+1fθ) − 1fcf (x'+1fθ') + 1rkr (x−1rθ) + 1rcr (x'−1rθ')
+ Ip/Ir (Tf/R+Tr/R) + (Tf/R+Tr/R) hp − 1fTf/Rtan η f − 1rTr/Rtan η r

Mx" = −kf (x+1fθ) − cf (x'+1fθ') − kr (x−1rθ) − cr (x'−1rθ')
− Tf/Rtan η f + Tr/Rtan η r

FIG. 14 am11=0, am12=1, am13=0, am14=0
am21=− (kf+kr)/M, am22=− (cf+cr)/M
am23= (−1fkf+1rkr)/M, am24= (−1fcf+1rcr)/M
am31=0, am32=0, am33=0, am34=1
am41= (−1fkf+1rkr)/Ip, am42= (−1fcf+1rcr)/Ip
am43= (−1f²kf+1r²kr)/Ip, am44= (−1f²cf−1r²cr)/Ip
bm11=0, bm12=0
bm21=−tan η f/ (MR), bm22=tan η r/ (MR)
bm31=0, bm32=0
bm41= (Ip/Ir+hp−1ftan η f)/(IpR), bm42= (Ip/Ir+hp−1rtan η r)/(IpR)

$$I_z \cdot \psi'' = L_f \cdot F_{yf} - L_r \cdot F_{yr}$$

$$F_{yf} = F_{wxf} \cdot \sin \delta_f + F_{wyf} \cdot \cos \delta_f$$

$$F_{yr} = F_{wxr} \cdot \sin \delta_r + F_{wyr} \cdot \cos \delta_r$$

$$M \cdot A_y = F_{yf} + F_{yr}$$

$$\beta' = A_y / V - \phi'$$

$$F_{wxf} = -\mu r \cdot F_{zf}, \quad F_{wxr} = -\mu r \cdot F_{zr}$$

$$F_{wyf} = \mu C_{pf} \alpha_f F_{zf}, \quad F_{wyr} = \mu C_{pr} \alpha_r F_{zr}, \text{ where } \alpha_f = \delta_f - L_f \psi'/V - \beta,$$
$$\alpha_r = \delta_r + L_r \psi'/V - \beta$$

$$[\psi'; \beta]' = A_n [\psi'; \beta] + B_n [\delta_f; \delta_r]$$

$$D_f = F_{wxf}\cos\alpha_f - F_{wyf}\sin\alpha_f \approx -(\mu r + \mu C_{pf}\alpha_f^2)F_{zf}$$

Eq. (13)

$$D_r = F_{wxr}\cos\alpha_r - F_{wyr}\sin\alpha_r \approx -(\mu r + \mu C_{pr}\alpha_r^2)F_{zr}$$

$$D_{xf} = F_{wxf}\cos\delta_f - F_{wyf}\sin\delta_f \approx -(\mu r + \mu C_{pf}\alpha_f\delta_f)F_{zf}$$

Eq. (15)

$$D_{xr} = F_{wxr}\cos\delta_r - F_{wyr}\sin\delta_r \approx -(\mu r + \mu C_{pr}\alpha_r\delta_r)F_{zr}$$

$$w1 = R \cdot D_f, \quad w2 = R \cdot D_r$$

$Q = [0 0 0 0; 0 1e200; 0 0 0 0; 0 0 0 1e4], \quad R = [1 0; 0 1e-5]$

Eq. (19)

$J = \int [x^r(t) Q x(t) + u^r(t) R u(t)] dt$

Eq. (20)

$u(t) = -F x(t), \quad F = R^{-1} B m^r P$

$Fzf = -kf(x + 1f\theta) - cf(x' + 1f\theta') - Tf/R \tan \eta f$

Eq. (23)

$Fzr = -kr(x - 1r\theta) - cr(x' - 1r\theta') + Tr/R \tan \eta r$

$TtmStab = \{G(s) \cdot Ttm \cdot Nd + H(s) \cdot (w1 + w2)\} / Nd$

VIBRATION CONTROL APPARATUS FOR AUTOMOTIVE VEHICLE

BACKGROUND OF THE INVENTION

1. Field of the Invention

The present invention relates to a vibration control apparatus for an automotive vehicle and particularly to a vehicle control apparatus for suppressing vibrations such as a front/rear vibration, left/right vibration and up/down vibration, caused by a driver's operation of an accelerator, steering and brake.

2. Description of the Related Art

One of the conventional vibration control is made through a suspension, wherein a squat and dive during driving and braking are suppressed by a suspension geometry, or wherein the vibrations are suppressed by changing a damper spring or stiffness characteristics of the suspension, as disclosed in JP2001-30728A, pages 2-8, 11 and 12, FIG. 6.

Further, a driving force control method for suppressing the vibration of the vehicle body due to the driving force caused by the accelerator operation is disclosed in JP9-112329A, 1997, pages 2-4 and 6, FIG. 3.

In the above-mentioned driving force control method, a higher frequency spectrum of the accelerator operation signal is damped by applying, to the accelerator operation signal, a low pass filter for a first order delay or high pass filter for a first order advance, whereby any shock due to an abrupt change in the driving force when the driver abruptly operates the accelerator is suppressed. Further, the front/rear vibration uncomfortable for a passenger is suppressed by damping natural vibration components in a wheel driving system.

Further, it is disclosed, in JP3-47444A, 1991, pages 1-3, FIG. 4 and JP59-23037A, 1984, pages 1-3, FIG. 1, that the engine output is compensated in order to reduce the vehicle body vibration by detecting the vehicle body vibration by using an acceleration sensor, in such a manner that the engine output is compensated by a vibration of which phase is reverse to that of the vehicle vibration, if the vehicle vibration becomes greater than a prescribed vibration.

Recently, platforms (vehicle body type) of the engine and body have been unified for a plurality of kinds of vehicles. Accordingly, it is advantageous that a unified vibration control model for the plurality of kinds of vehicles is used, because the vehicle control is achieved by merely changing control parameters and fixed parameters.

As for the vehicle performances, a greater change in the ground loads of the wheels due to the vehicle vibration disadvantageously affects fundamental performances such as running, turning and stopping of the vehicle. For example, if the ground load of one of the wheels is decreased, a reaction force from the road surface is decreased, thereby possibly decreasing the braking force or turning force. Accordingly, it is required to suppress to the utmost the vehicle vibration which is one of the factors which changes the ground load.

In light of the above-mentioned vehicle vibration suppression, JP2001-30728A suppresses the vibration by using a model of vibration on the springs of the front and rear wheels corresponding the suspension system of the front and rear wheels, wherein only the damping force of the shock absorber of the suspension is compensated, even when the vibration is caused by the driver's operation of the steering, accelerator or brake.

Further, the above-mentioned model of vibration on the springs of the front and rear wheels is a dynamic model merely for deciding how the position of the center of gravity of the vehicle is changed by the suspension operation. In general, the vibrations uncomfortable to the passenger are threefold, i.e., a first (several Hertz (1 to 2 Hertz)) on-spring vibration of the vehicle body itself, second (about 10 Hertz) under-spring vibration and third (35 to 40 Hertz) vibration (tire vibration) of the wheels due to the reaction force from the road surface along the vertical direction and/or the twisting direction. The first vibration is most uncomfortable, the second vibration is second most uncomfortable and the third vibration is least uncomfortable than the first and second vibration, although the factor which causes the vibration is based on the reaction force received by the tire from the road surface and the reaction force is based on the driving/braking/turning forces caused by engine output/braking operation/steering operation, respectively. The reaction force causes the under-spring vibration under the suspension which causes the on-spring vibration. Accordingly, the vibration model might preferably have priority over the third vibration in accordance with an order of generation and transfer of the vibration, while the vibration control might preferably have priority over the first vibration in accordance with the uncomfortable degrees of the vibration.

In light of the above-mentioned model and control of the vibration, JP2001-30728A merely employs the two wheel on-spring vibration model which analyzes dynamically the suspension portion. Therefore, it can not achieve an optimum control of the vibration uncomfortable to the passenger.

Further, JP9-112329A, 1997, JP3-47444A, 1991 and JP59-23037A, 1984 do not include any model for suppressing the vibration. For example, in JP9-112329A, 1997, the accelerator operation signal is directly filtered in order to suppress the vehicle vibration. In this case, if the filter characteristics are not adaptively changed, the vehicle vibration may possibly be gradually diverged greatly, e.g., when the accelerator pedal is repeatedly stepped down strongly and weakly. Further, as for the adaptive change of the filter characteristics, it is not easy to determine, for example, when the filtering range should be recovered after narrowing it.

SUMMARY OF THE INVENTION

An object of the present invention is to execute an optimum control of the vibration of the vehicle body.

The vehicle vibration control apparatus of the present invention includes Features 1 to 3 stated below.

In Feature 1, in response to inputs indicative of the driver's operation of an accelerator, steering and brake, vibrations are calculated regarding a tire vibration due to a road surface reaction force, under-spring vibration of a suspension and on-spring vibration of a vehicle body. Then, the inputs are compensated in order to reduce the vibrations. Here, the on-spring and under-spring vibrations may include not only the vibrations of suspension (spring and damper arm), but also the vibrations of moving members such as the wheel and differential which can move independently of the vehicle body.

Conventionally, the vibration was fed back to the suspension, or the driver's operation was directly filtered. However, in the present invention, the input of the driver's operation is compensated by using a kinetic model (vibration calculating means). The present invention has an advantage that a response is more rapid compared with the conventional feedback to the suspension. Further, the present invention has another advantage that the input is accurately compensated by the kinetic model. Further, the present invention has still another advantage that the vibration is rapidly suppressed without being diverged, even if the driver's operations of an accelerator, steering or brake is repeatedly and continuously generated.

The above-mentioned kinetic model (vibration calculation means) may include: a tire model for calculating a tire vibration due to a road surface reaction force; a suspension model for calculating an under-spring vibration of a suspension; a vehicle body model for calculating an on-spring vibration of a vehicle body. The inputs are compensated in order to reduce the vibrations, giving priority to the vehicle body model.

Further, the tire model, suspension model and vehicle body model may be connected in series, thereby united into a single kinetic model.

Conventional kinetic model controlled the suspension in order to suppress the vehicle body vibration. However, in the kinetic model of the present invention, the tire vibration due to a change in the engine output is first absorbed by the suspension. Next, a residual vibration which cannot be absorbed by the suspension is transferred to the vehicle body. Then, those vibrations are suppressed by three feed-back loops between the input of the tire model and outputs of the above-mentioned three models incorporated in the kinetic model.

In Feature 2, the inputs for the kinetic model are engine torque required by the driver, steering and braking operation. Conventionally, the input was merely fed back from the vehicle body model to the suspension model. However, there are provided in the present invention three compensating means (three feed-back loops). They are feed-back means from the vehicle body; feed-back means from the suspension model; and feed back means from the tire model. More-over, the feed-back compensation from the vehicle body model is executed always with the highest priority over other two feed-back loops. Accordingly, the vibration which is felt most uncomfortable to the passenger is suppressed always with the highest priority, whereby a more comfortable ride is given.

Further, the inputs may include not only the driver's operation, but also an external factor outside the vehicle (external disturbance) such as a road surface state (e.g., projection, roughness, friction, slope), thereby reducing a vibration caused by the external factor.

Further, the input compensation may be made in such a manner that the vibrations caused by all factors such as the external factor and driver's operations may be suppressed.

In Feature 3, the vibration suppression may be made in such a manner that a displacement of the center of gravity of the vehicle body or displacement of a head position of a passenger is reduced. The passenger's position may be a head position of the drive, or a head position of the passenger seated on a rear seat if the vehicle is of higher grade.

BRIEF EXPLANATION OF THE DRAWINGS

FIGS. 8A to 8H shows the vehicle vibration under an input of only the driving force requested by the driver.

FIGS. 9A to 9H shows the vehicle vibration under an input of only the travelling resistance (external disturbance).

FIG. 11 shows Equation (1) of a pitching motion.

FIG. 12 shows Equation (2) of a bounce motion of the vehicle body.

FIG. 13 shows an equation of state (3) of motion.

FIG. 14 shows coefficients of Eq. (3) as shown in FIG. 13.

FIG. 15 shows Equation (4) of a yawing motion.

FIG. 16 shows Equation (5) of a front lateral force.

FIG. 17 shows Equation (6) of a rear lateral force.

FIG. 18 shows Equation (7) of an equation of motion along the lateral direction of the vehicle.

FIG. 19 shows Equation (8) of the time derivative $\beta'$ of a side slip angle $\beta$.

FIG. 20 shows Equation (9) of a front tire and rear tire force in terms of rolling resistance coefficient and tire loads.

FIG. 21 shows Equation (10) of tire lateral forces of the front and rear wheels.

FIG. 22 shows Equation (11) approximations of a yaw rate $\phi'$ and side slip angle $\beta$.

FIG. 23 shows coefficients of Eq. (11) as shown in FIG. 22.

FIG. 24 shows Equations (12) and (13) of drags Df and Dr of the front and rear wheels, respectively.

FIG. 25 shows Equations (14) and (15) of drags Df and Dr along the longitudinal directions.

FIG. 26 shows Equation (16) of a front wheel torque and rear wheel torque.

FIG. 27 shows Equation (17) of a summation of braking force, driving force and external disturbance.

FIG. 28 shows Equations (18), (19), (20) and (21) of the optimum regulator method.

FIG. 29 shows Equations (22) and (23) of front and rear wheel loads, respectively.

FIG. 30 shows Equation (24) regarding a compensation formula for reducing the on-spring vibration due to the driving force and drag. The driving force approximated by G(s) and H(s), thereby reducing the on-spring vibration due to the driving force and drag.

PREFERRED EMBODIMENT OF THE INVENTION

Figure 1:
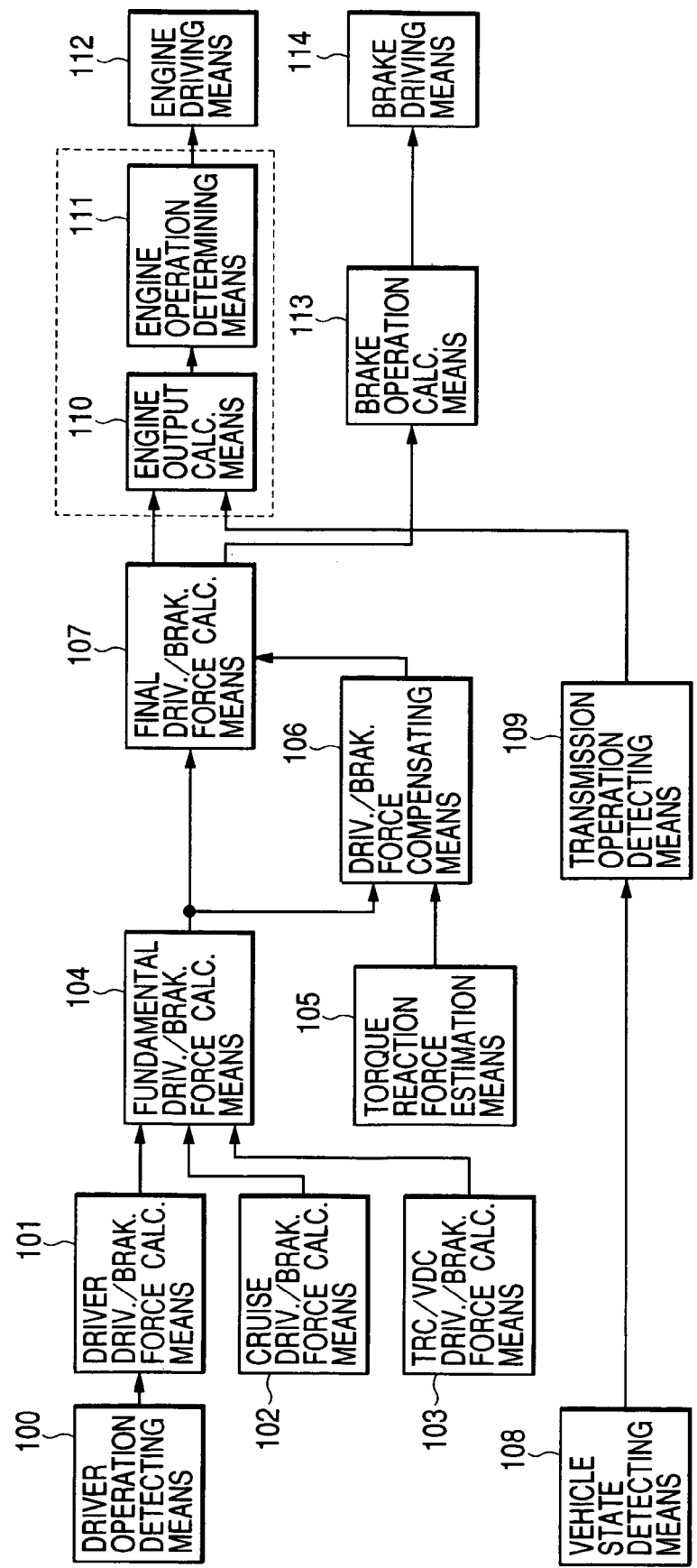
FIG. 1 is a block diagram of the vehicle vibration control apparatus of the present invention.

The preferred embodiment is explained, referring to the drawings.

FIG. 1 is a block diagram of the vehicle vibration control apparatus of the present invention.

Driver operation detecting means 100 detects an operation quantity by a driver of an accelerator pedal, brake pedal and steering wheel, e.g., a setting down strokes of the accelerator pedal and brake pedal and turning angle of the steering, or alternatively a throttle state and brake master cylinder pressure.

Driver driving and braking force calculating means 101 calculates a driving force and braking force in accordance with the driver's intention on the basis of the operation quantity detected by the driver operation detecting means 100.

Further, cruise driving and forces calculating means 102 calculates a driving force and braking force requested by a cruise control apparatus if any. Further, Traction (TRC)/vehicle demeanor control (VDC) driv. and brak. force calc. means 103 calculates a driving force and braking force requested by the TRC and VDC if any.

Fundamental driv./brak. forces calc. means 104 determines a priority order of, or arbitrates, the calculation results by the driver driv./brak. calc. means 101, cruise driv./brak. calc. means 102 and TRC/VDC driv./brak. calc. means 103. Thus, a fundamental driving force and braking force, e.g., selected from among the three calculation results are outputted from the fundamental driv./brak. forces calc. means 104.

Driv./brak. forces compensating means 106 compensates the fundamental driv./brak. forces outputted from the fundamental driv./brak. forces calc. means 104, if there may possibly be caused an unfavorable vibration for the vehicle demeanor and/or passenger's feeling which is caused by various factors such as a decrease in the road reaction force due to a side slip angle caused by the steering operation, sudden accelerator operation, sudden braking operation, abrupt changes in the driving force and braking force due to cruise control or TRC/VDC control.

Torque/reaction force estimating means 105 estimates a torque/reaction force due to an external factor, e.g., road surface roughness, road slope or road friction, which may possibly change suddenly the road surface reaction force in accordance with a change in a travelling resistance transferred from the road surface through the tires, even when the calculation result by the fundamental driv./brak. forces cal. means 104 is not suddenly changed. The output from the torque/reaction force estimating means 105 together with the output from the fundamental driv./brak. forces calc. means 104 is inputted into the driv./brak. forces compensating means 106.

Final driv./brak. forces calc. means 107 calculates a final driving force and braking force on the basis of the outputs from the fundamental driv./brak. forces calc. means 104 and driv./brak. forces compensating means 106. A final driving force and final braking force are calculated, in accordance with a requested control amplitude and particularly with a negative requested value, within an adjustable range. The final driving force is inputted into engine output calc. means 110, while the final braking force is inputted into brake operation calc. means 113. Here, the final driv./brak. forces calc. means 107 may possibly neglect the output from the driv./brak. compensating means 106, e.g.: when the output from the fundamental driv./brak. forces calc. means 104 may not cause any up/down/twisting vibration of the tires which causes the suspension vibration or further on-spring vibration; when a suspension model as stated later determines that the vehicle vibration is not caused, due to, e.g., an absorption by the suspension of the above mentioned tire vibration; and when the suspension model determines that the vibration on the vehicle spring may not make the passenger feel uncomfortable.

The engine output calc. means 110 calculates an engine power on the basis of the output from the final driv./brak. forces calc. means 107 and output from transmission operation detecting means 109 which detects, on the basis of a state of the vehicle, e.g.: wheel speeds; an engine rotation number; a wheel driving shaft rotation number; and a ratio of rotation numbers of an input axis of the torque converter to that of an output axis, detected by vehicle state detecting means 108, an operation state of the transmission system such as a transmission gear ratio or slipping state of a torque converter.

Engine operation determining means 111 determines such operation quantities as an in-take air, fuel injection, and ignition angle, thereby outputting the determined quantities to engine driving means 112.

The brake operation calc. means 113 calculates quantities of operation of devices, e.g., a brake actuator, thereby outputting the calculated quantities to brake driving means 114.

Figure 2:
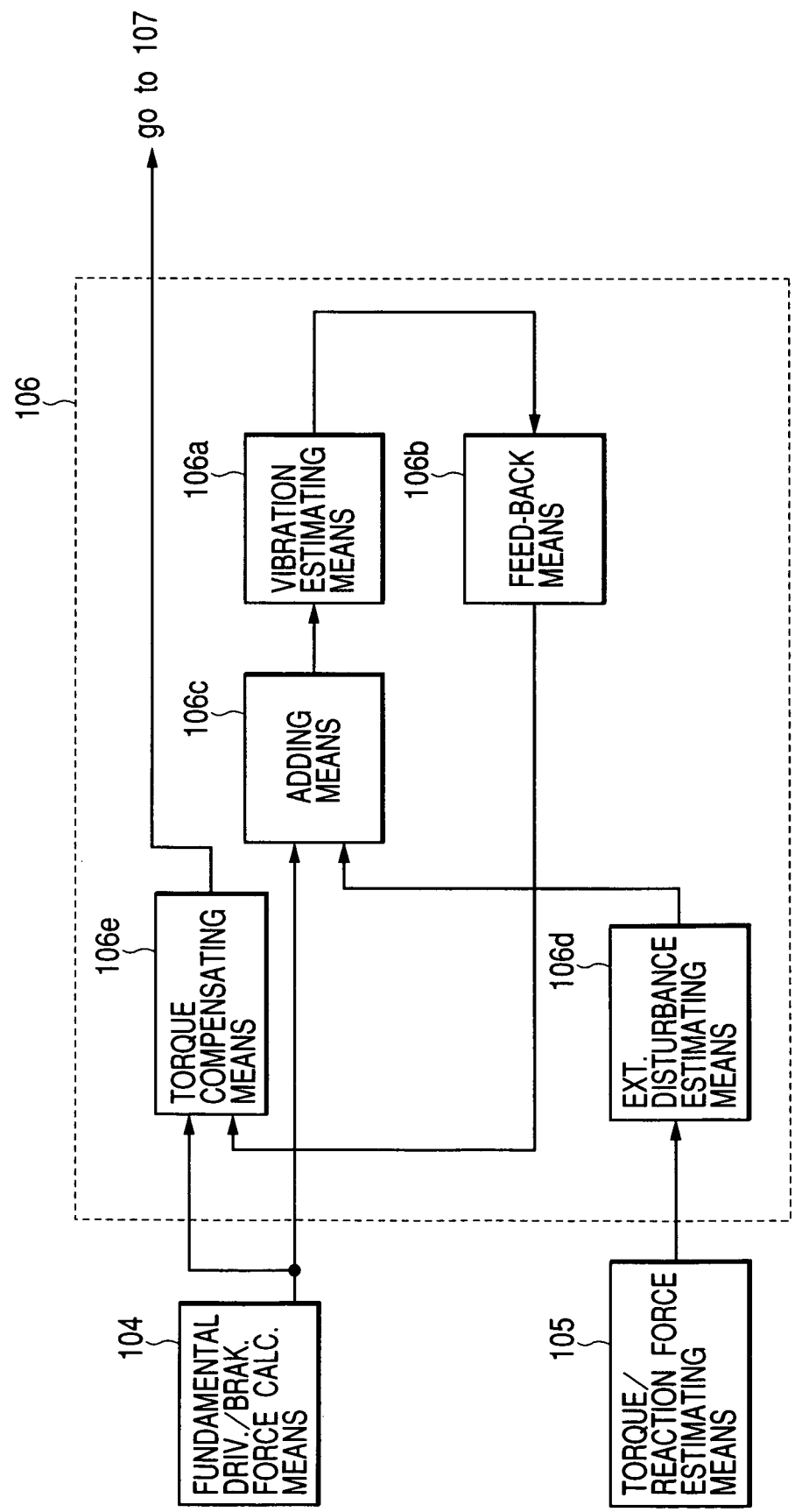
FIG. 2 is a block diagram of the driving and braking forces compensating means 106 as shown in FIG. 1.

FIG. 2 is a block diagram of the driv./brak. forces compensating means 106 as shown in FIG. 1.

The output from the fundamental driv./brak. calc. means 104 is inputted into input torque compensating means 106e.

Further, the output from the torque/reaction force estimating means 105 is inputted into external disturbance estimating means 106d which calculates an external disturbance due to the above-mentioned external factor acting on the vehicle. The external disturbance outputted from the external disturbance estimating means is inputted into adding means 106c which adds the output from the external disturbance estimating means 106d to the output from the fundamental driv./brak. forces calc. means 104. The calculation result of the adding means 106c is inputted into vibration estimating means 106a.

The vibration estimating means 106a estimates a vehicle vibration on the basis of a vibration model for modeling a displacement of center of gravity of a vehicle body due to the above-mentioned torque reaction force, on the basis of vehicle parameters such as a vehicle body weight, engine weight and suspension characteristics of front and rear wheels. The inputs parameters inputted into the kinetic model is the torque reaction force acted on the tires, suspension and vehicle body spring, in this order. Here, the torque/reaction force is dependent upon: an engine driving force, braking force; travelling resistance; and road surface reaction force. Further, in place of the center of gravity of the vehicle body, a driver's head position or passenger's head position seated on the rear seat may be employed. Further, the internal parameters in the kinetic model are pitch and roll angles, vertical displacement of the vehicle and their time derivatives and so on.

Feed-back means 106b decides feed-back gains for compensating the fundamental driving and braking forces in such a manner that the time derivatives of the internal parameters in the vibration estimating means 106a are suppressed as rapidly as possible. Here, the feed-back gains may be decided on the basis of priorities given to the internal parameters, for example, in such a manner that the highest priority is given to a pitch rate, the second highest priority is given to a pitch angle and the lowest priority is given to ground load of the front and rear wheels. The internal parameter is multiplied by the feed-back gain and is inputted into the torque compensating means 106e, thereby compensating the fundamental driving and braking forces. The compensated fundamental driving and braking forces outputted from the torque compensating means 106e are inputted into final driv./brak. forces calc. means 107 as shown in FIG. 1.

Figure 3:
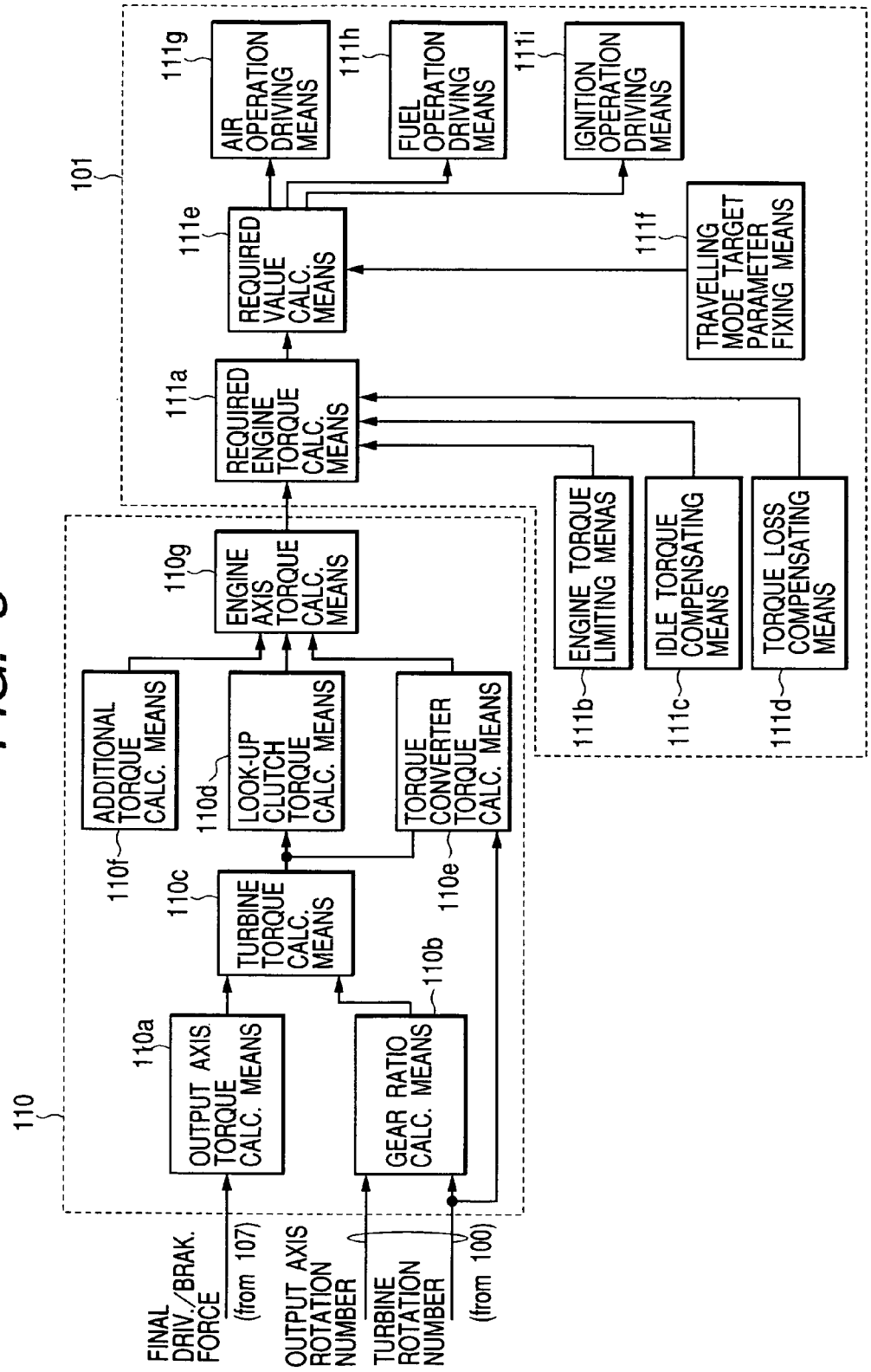
FIG. 3 is a block diagram of the engine output calculating means 110 together with the engine driving means 111 as shown in FIG. 1.

FIG. 3 is a block diagram of the engine output calc. means 110 together with the engine driving means 111 as shown in FIG. 1.

In the engine output calc. means 110, output axis torque calc. means 110a calculates a torque outputted from the output axis of the transmission by calculating a final reduction gear ratio on the basis of the final driving and braking forces from the final driv./brak. forces calc. means 107.

On the other hand, present reduction ratio calc. means 110b calculates a present reduction gear ratio on the basis of the rotation number of the output axis of the transmission and the turbine rotation number detected by the transmission operation detecting means 109.

Turbine torque calc. means 110c calculates a torque of the transmission turbine axis on the basis of the above-mentioned output axis torque and present reduction gear ratio. Here, the turbine axis torque is a sum total of a torque $T_1$ transferred by a lock-up clutch and torque $T_2$ transferred by a torque converter. Accordingly, $T_1$ as calculated by lock-up clutch torque calc. means 110d and $T_2$ as calculated by torque converter torque calc. means 110e are summed up, thereby obtaining a transmission input torque inputted into the transmission. Then, engine axis torque calc. means 110g adds the above-mentioned transmission input torque to additional torques due to an alternator and air compressor and so on calculated by additional torque calc. means 110f, thereby obtaining an engine axis torque.

Then, the engine crank axis torque calculated by the engine axis torque calc. means 110g is inputted into required engine torque calc. means 111a in the engine operation determining means 111. The required engine torque calc. means 111a calculates a required engine torque to be generated by the engine combustion, on the basis of: the output from engine torque limiting means 111b for limiting the torque; output from torque compensating means 111c for controlling an idling rotation number of the engine; and output from torque loss compensating means 111d for compensating internal losses such as a mechanical friction loss and pumping loss.

Required value calc. means 111e calculates an in-take air quantity, fuel quantity and ignition timing, in such a manner that various conditions (such as a combustion mode and target fuel consumption depending various driving states fixed by travelling mode/target parameter fixing means 111f) are satisfied.

Then, on the basis of the output from the required value calc. means 111e, the operation quantities of an air operation device, fuel operation device and ignition operation device are calculated by air operation driving means 111g, fuel operation driving means 111h and ignition operation driving means 111i, respectively. Thus, the above-mentioned operation quantities are inputted into the engine driving means 112.

Next, the kinetic model provided in the vibration estimating means 106a as shown in FIG. 2 is explained.

Figure 4:
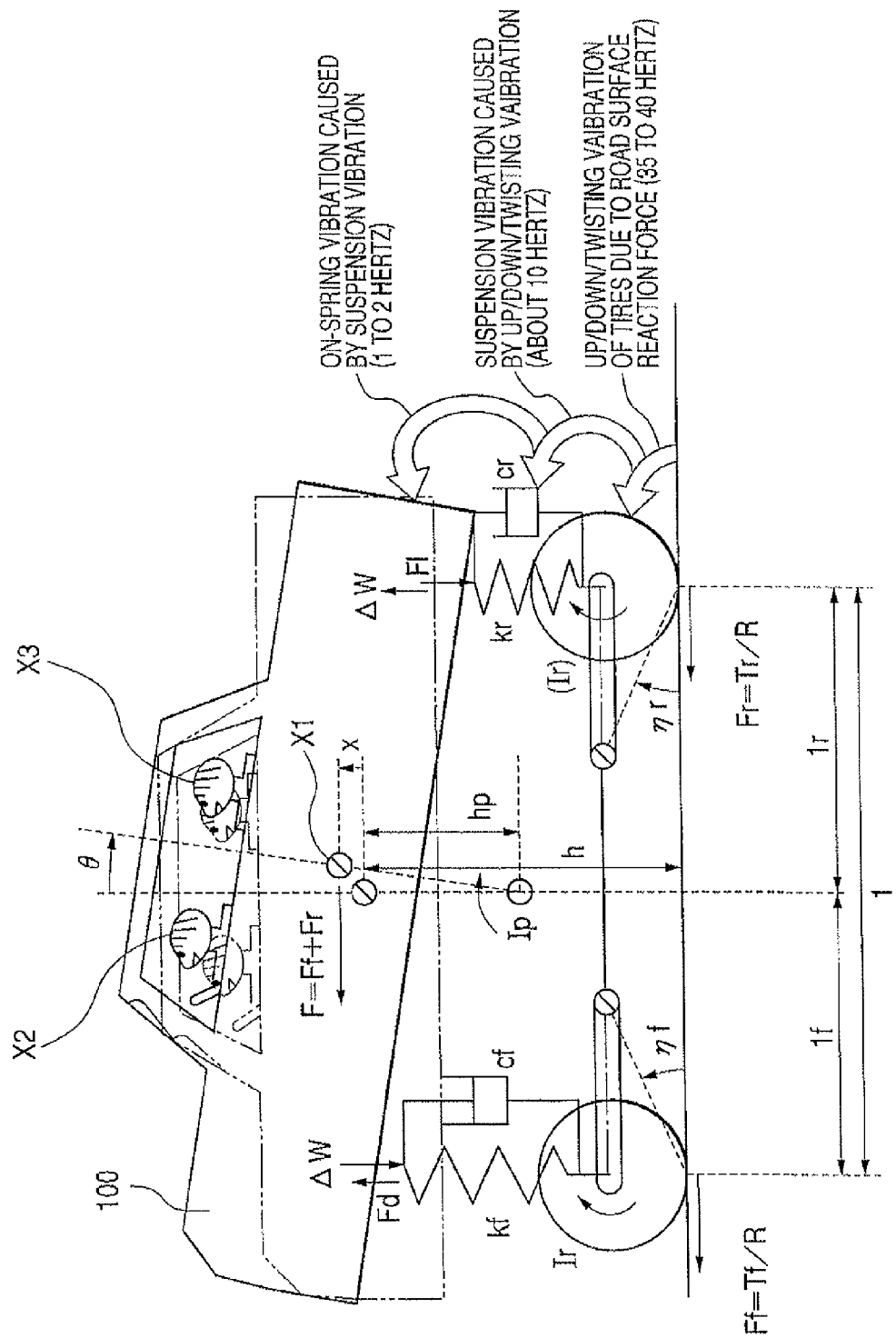
FIG. 4 illustrates a kinetic model comprising a tire model, suspension model and vehicle body model connected in series, wherein at least one of the road surface disturbance, braking and driving forces are applied on the tires.

FIG. 4 illustrates a kinetic model is a two-wheel model wherein a vehicle 100 is provided with a front and rear suspensions. The vibration calculating means (kinetic model) is based on a parameter Tf (a wheel torque of a front wheel and parameter Tr (a wheel torque of a rear wheel). It comprises: a tire model for expressing an operation of the road surface reaction force generated by the tires in response to the road surface disturbance, braking force, driving force and steering operation; a suspension model for spring system and damper system in accordance with the front and rear wheels; and a vehicle model for expressing an on-spring vibration and its direction of the center of gravity X1 of the vehicle body.

As shown in FIG. 4, at least one of the road surface disturbance, braking and driving forces are applied on the tires.

When Tf and Tr are applied to the front and rear wheels, respectively, the vehicle body rotates θ around the pitch axis, thereby moving its center of gravity by "x".

The equation of motion around the pitch axis of the vehicle body is expressed by Eq. (1) as shown in FIG. 11, where spring constants are "kf" and "kr" for the front and rear suspensions, respectively, damping constants are "cf" and "cr" for front and rear suspensions, respectively, a tire radius is "R", an angle made by a line (from an instantaneous rotation center of the front wheel to a point of contact on the ground of the front wheel) and by another line (from the instantaneous rotation center of the front wheel to the front wheel center) is "ηf", an angle made by a line (from an instantaneous rotation center of the rear wheel to a point of contact on the ground of the rear wheel) and by another line (from the instantaneous rotation center of the rear wheel to the rear wheel center) is "ηr", a pitch moment of inertia on the vehicle body is "Ip", a distance between the front wheel and pitch center is "lf", a distance between the rear wheel and pitch center is "lr", a distance between the pitch axis and center of gravity is "hp" and a moment of inertia of the vehicle body is "Ir".

Further, the equation of motion of an up and down motion of the vehicle body is expressed by Eq. (2) as shown in FIG. 12.

Then, the equation of state is expressed by Eq.(3) as shown in FIG. 13, where x1 is x, x2 is x', x3 is θ, x4 is θ', u1 is Tf and u2 is Tr.

Here, Am is expressed by amij (i, j=1 to 4), while Bm is expressed by bmij (i, j=1 to 4), as shown in FIG. 14.

Figure 5:
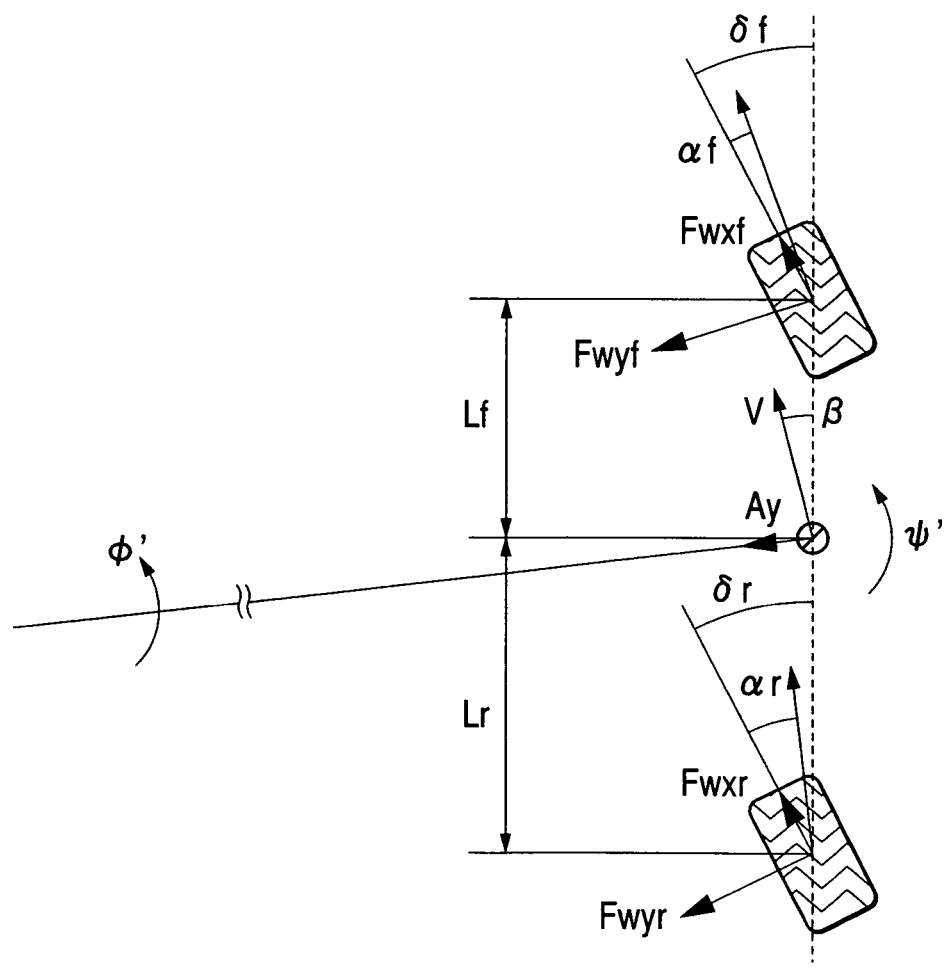
FIG. 5 is an illustration for explaining a turning motion and drag during the steering operation in the two-wheel kinetic model.

FIG. 5 is an illustration for explaining a transverse motion and drag during the steering operation in the two-wheel kinetic model.

The equation of motion around the yaw axis is expressed by Eq. (4) as shown in FIG. 15, where a yaw moment of inertia is "Iz", a distance between the front wheel and center of gravity is "Lf", a distance between the rear wheel and center of gravity is "Lr", a transverse force generated by the front wheel is "Fyf", a transverse force generated by the rear wheel is "Fyr" and a yaw rate is "φ'".

Further, the lateral forces Fyf, Fyr acted on the front and rear of the vehicle body, respectively are expressed by Eqs. (5) and (6), respectively, as shown in FIGS. 16 and 17.

Further, the equation of motion along the lateral direction of the vehicle body is expressed by Eq. (7) as shown in FIG. 18, where the vehicle mass is "M" and lateral acceleration is "Ay".

Figures 20, 21, 22, 23:
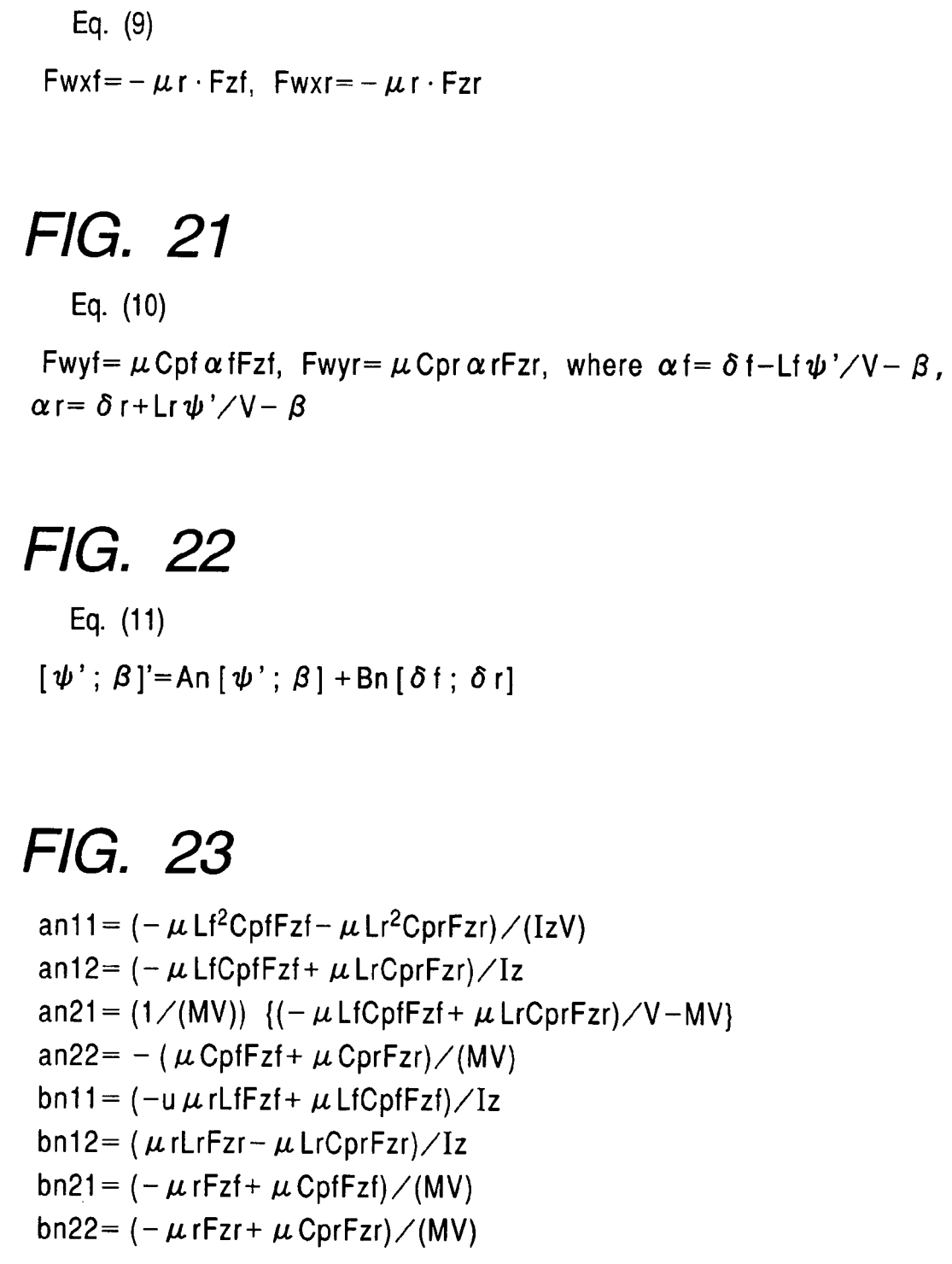

Further, the time derivative β' of a side slip angle β is expressed by Eq. (8) as shown in FIG. 19, where "V" is a vehicle velocity. Under an assumption that the braking nor driving is acted on the tires, a front tire force and rear tire force are expressed by Eq. (9) as shown in FIG. 20, where a rolling resistance coefficient is "μr", loads of the front and rear tires are "Fzf" and "Fzr", respectively.

Further, tire lateral forces of the front and rear wheels are expressed by Eq. (10) as shown in FIG. 21, where a road surface friction coefficient is "μ", cornering powers of the front rear wheels are "Cpf" and "Cpr", respectively, tire slip angles of the front and rear wheels are "αf" and "αr", respectively.

Accordingly, the yaw rate φ' and side slip angle β are approximated by Eq. (11) as shown in FIG. 22, under a condition that the steering angles δf and δr of the front and rear wheels, respectively and slip angles αf and αr of the front and rear wheels, respectively are small in such a manner that cos δ≈1 and sin δ≈δ.

Here, An and Bn in Eq. (11) are expressed by aij (i, j=1 to 2) and bij (i, j=1 to 2), respectively as shown in FIG. 23.

Next, the drags Df and Dr for the front and rear wheels, respectively are expressed by eqs. (12) and (13) as shown in FIG. 24, respectively, where the drag is an action force, generated by the tires during the steering operation, acted along the direction reverse to the moving direction of the vehicle. The drag may be deemed to be a kind of external disturbance. The drags expressed by Eqs. (12) and (13) are directed to the reverse of the moving direction.

Figure 6:
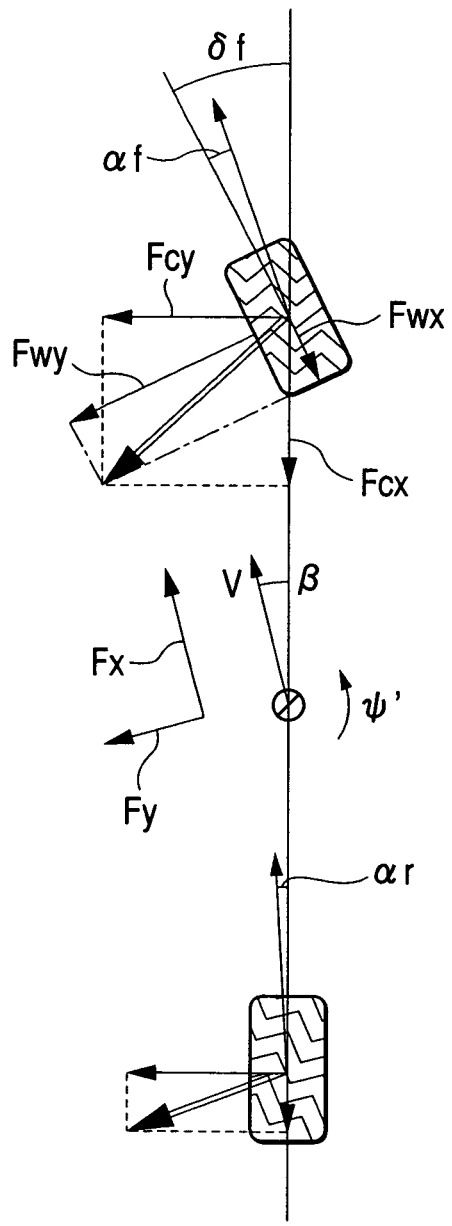
FIG. 6 illustrates a motion due to drag along the front and rear direction of the vehicle.

However, here, referring to FIG. 6, the drags Dxf and Dxr along the front and rear direction of the vehicle are studied. The Dxf and Dxr along the front and rear directions are expressed by Eqs. (14) and (15) as shown in FIG. 25.

Then, the front wheel torque w1 is Dxf multiplied by the tire radius "R", while the rear wheel torque w2 is Dxr multiplied by the tire radius "R". They are expressed by Eq. (16) as shown in FIG. 26. The wheel torques w1 and w2 are deemed to be an external disturbance due to the steering operation when the driving and braking forces are acted.

The kinetic model for the transverse motion and drag is unified into single model as shown in FIG. 4.

Next, the vibration control against the braking and driving forces is explained.

First, the braking force, driving force and external disturbance are summed up in accordance with Eq. (17) as shown in FIG. 27, where coefficients Am, Bm and Em are matrixes.

In Eeq. (17), if, e.g., the vehicle is of rear wheel driving, the input "u2" is Ttm×Nd, where Ttm is a required transmission axis torque and Nd is a deferential gear ratio, and the external disturbances are "w1" and "w2", where "w1" is Dxf×R and "w2" is Dxr×R.

The driving force is controlled in such a manner that the output of the on-spring motion [x1; x2; x3; x4] for the required value Ttm×Nd is fed-back to the required value, thereby making the feed-back result of the required value be a compensated wheel torque TwStab. TwStab is divided by Nd, thereby obtaining a compensated required torque Ttm-Stab which controls the driving force. The feed-back gain is determined in such a manner that vibrations of X' and θ' are reduced.

For example, for given weighting matrixes Q and R as expressed by Eq. (18), the criterion function J as expressed by Eq. (19) is minimized, where u(t) is expressed by Eq. (20). Eqs. (18), (19) and (20) are shown in FIG. 28. In Eq. (20), "F" is a feed-back gain matrix and "P" is a positive definite symmetrical matrix of Riccaci algebraic equation as expressed by Eq. (21) as shown in FIG. (28).

Although the above-mentioned vibration control was based on the optimum regulator method, the pole placement method or other method may be employed.

The vibration calculating means calculates an on-spring motion of the vehicle responsive to the driving torque caused by the sudden accelerator operation. Further, the feed-back gain is determined on the basis of the calculated on-spring motion such as the pitch rate and vertical velocity, thereby correcting the driving force in such a manner that the pitch rate and vertical velocity is reduced. As a result, the driver's uncomfortable feeling is reduced, because the on-spring two-wheel model employs parameters of the actually used vehicle.

When the steering operation is done, the lateral force of the front and rear wheels are generated and the front and rear drags which reduce the forward motion of the vehicle is increased, thereby generating the pitching motion which is a longitudinal vibration at locations above the center of gravity. The drag as an external disturbance is inputted into the on-spring two-wheel model, wherein the drags are fed-back to the driving force. In the feed-back compensation, the driving force is increased during turning the steering in one direction, while it is decreased during turning the steering in on direction and then the other, thereby suppressing the pitching and bounce motions.

Due to the above-mentioned feed-back compensation, the rear tire contacts well on the road surface and the yawing motion is stabilized, during turning the steering in one direction, because the load is shifted toward the rear wheel. Further, the steering operation response is improved during turning the steering in one direction and then the other, because the load is shifted toward the front wheel.

Figure 7A:
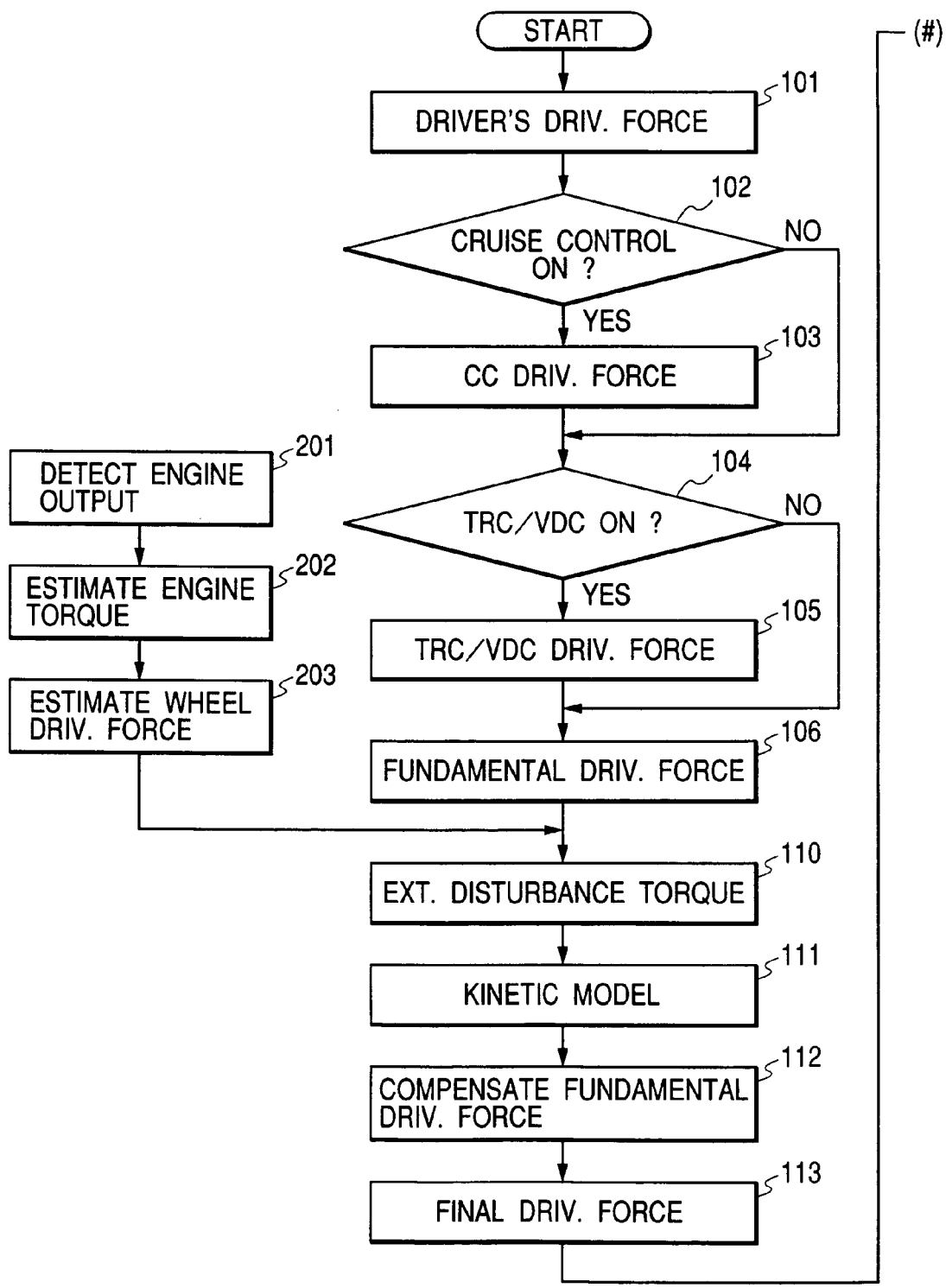
FIG. 7A together with 7B is a flow chart of the vibration control and particularly of the driving force control of the present invention.
Figure 7B:
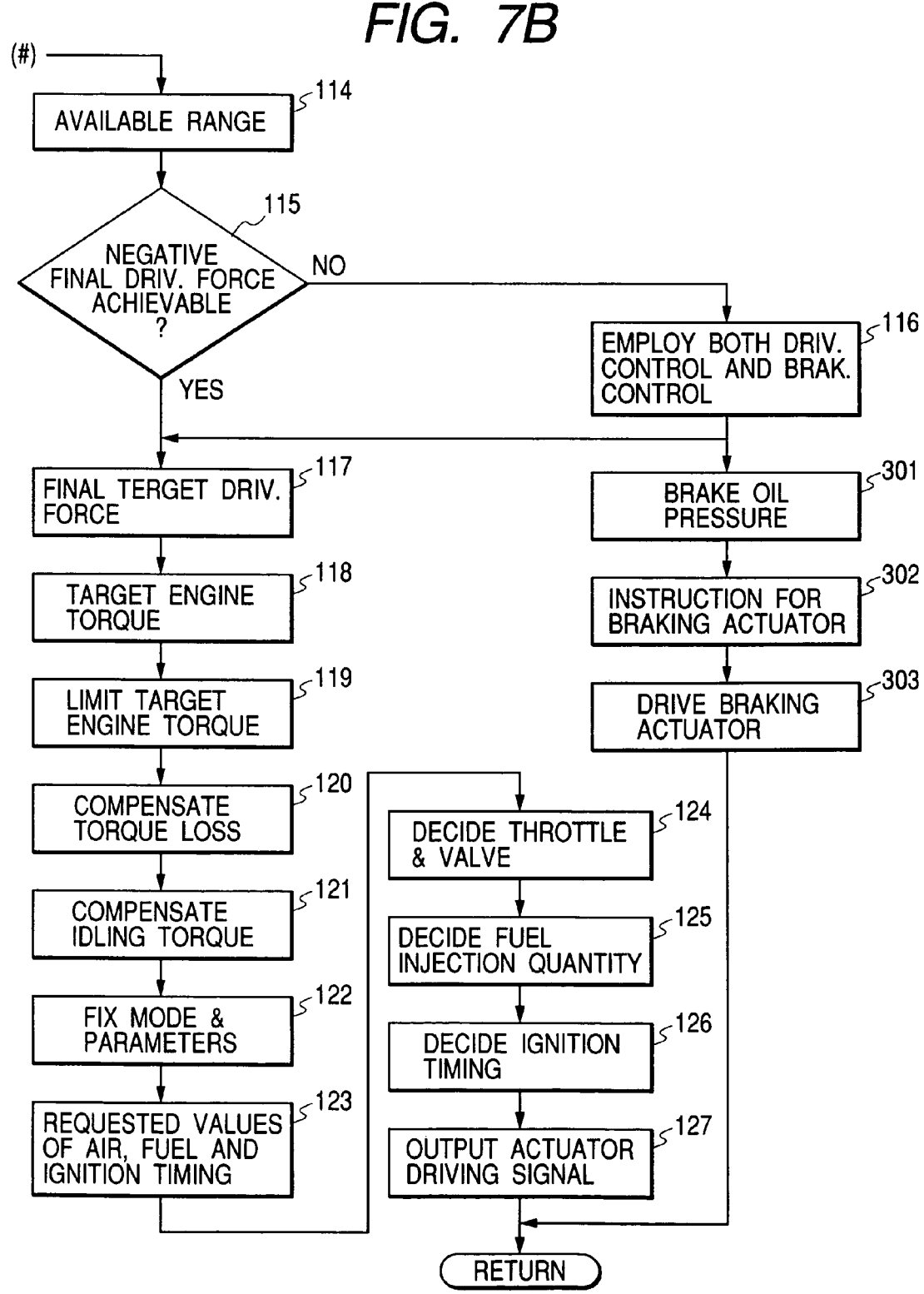

FIG. 7A together with FIG. 7B is a flow chart of the vibration control and particularly of the driving force control of the present invention. The same flow chart is applicable for the braking force, if the driving force is replaced by the braking force.

The driving force control is started by turning on the ignition switch.

First, at S101, a driving force (driv. force) requested by a driver (driver's driv. force) is calculated on the basis of the accelerator state and vehicle speed outputted from the driver operation detecting means 100.

At S102, it is determined whether or not the cruise control (CC) is being operated. If it is not being operated, then S104 follows, while if is being operated, then S103 follows.

At S103, the driv. force requested by CC is calculated on the basis of the target speed or acceleration calculated by CC. At the following S104, it is determined whether or not the traction control (TRC) and/or vehicle demeanor control (VDC) is being operated. If it is not being operated, then S106 follows, while if it is being operated, then S105 follows. At S105, the target driv. force requested by TRC/VDC (TRC/VDC driv. force) is calculated by TRC/VDC.

At the following S106, the driver's driv. force calculated at S101 is compensated, thereby obtaining the fundamental driv. force, taking into consideration the calculation results at S103 and/or S105 if any.

Next, at S110, the external disturbance torque transferred from the tires to the vehicle body (ext. disturbance torque) is calculated on the basis of the fundamental driv. force calculated at S106 and an estimated driv. force at the present time of the driving wheel. Here, the driv. force of the driving wheel is calculated at S201, 202 and 203. At S201, the present engine output is detected. Next, at S202, the engine output torque is estimated. Next, at S203, the driv. force actually generated at the driving wheel is estimated.

Next, at S111, the ext. disturbance torque estimated at S110 is inputted into the kinetic model, thereby obtaining various motion states. Then, at S112, the fundamental driv. force is compensated on the basis of the feed-back gains prescribed beforehand for the above-mentioned motion states. Further, at S113, the final driv. force is calculated on the basis of the above-mentioned compensated fundamental driv. force.

Next, at S114, a range of the driv. force available at the engine is calculated. Particularly when the final driv. force becomes negative, it is determined whether or not the negative final driv. force can be achieved by the engine driving means 112 (engine device driving means). Here, when the final driv. force calculated at S113 is within the available range calculated at S114, S117 follows.

Next, at S117, a final target driv. force is calculated, under an assumption that the above-mentioned final driv. force is achieved by the engine driv. means 112 when the above-mentioned final driv. force is achieved even if it is negative or when the above-mentioned final driving force is positive.

Next, at S118, a target engine torque is calculated on the basis of the final target driv. force, taking into consideration the torque ratio of the transmission and torque converter. Then, at S119, the target engine torque thus calculated is limited on the basis of the maximum allowable rotation number of the engine.

Next, at S120, the target engine torque is compensated, taking into consideration the loss by the air compressor, alternator and other auxiliary devices. Further, at S121, the target engine torque is compensated, taking into consideration the control of the idling engine rotation, thereby obtaining a net torque. Further, at S122, the travelling mode and target parameter such as a fuel consumption are fixed. Further, at S123, requested values of an air in-take, fuel consumption and ignition timing are calculated. Further, at S124, the throttle state and valve timing is calculated on the basis of the air in-take calculated at S123. Further, at S125, fuel injection quantity is calculated. Further, at S126, the ignition timing is calculated. Further, at S127, device actuators of the air system, fuel system and ignition system are driven, in response to the calculation results at S124, S125 and S126.

On the other hand, at S115, if it is determined that the final driv. force becomes negative and cannot be achieved, then S116 follows the negative final driv. force is compensated by a braking force. Following S116, there are two branches of the driving system control (S117 to S127) and braking system control (S301 to S303). The driving system control steps S117 to S127 execute controls within the available range calculated at S114 and S116.

On the other hand, at S301 to S303, the braking force employed at S116 is acquired. Concretely, at S301, an oil pressure of the braking system corresponding to the braking force is calculated. Then, at S302, an instruction for the braking actuator for generating the calculated oil pressure is calculated. Then, at S303, an output signal for driving the braking actuator is outputted on the basis of the above-mentioned instruction.

The above-explained control is repeated at a prescribed timing.

FIGS. 8A to 8H shows the vehicle vibrations under an input of only the driv. force requested by the driver, wherein the vibrations controlled by the above-explained kinetic model are shown by the solid lines, while the uncontrolled vibrations are shown by the dotted lines although they are shown by the solid lines if they are the same as the controlled vibrations. When the accelerator is stepped down in a step wave manner as shown in FIG. 8A, the driv. force requested by the driver (driver's driv. force) is changed in the step wave manner. The real driv. force as shown in FIG. 8C and driv. torque/reaction force as shown in FIG. 8D are delayed from the accelerator state and driver's driv. force, in accordance with the dynamic characteristics of the driving mechanism. In response to the driv. torque/reaction force as shown in FIG. 8D, pitch angle as shown in FIG. 8E, pitch rate as shown in FIG. 8F, ground load of the front wheel as shown in FIG. 8G and ground load of the rear wheel as shown in FIG. 8H show damping vibrations as shown by the dotted lines if the vibrations are not controlled. The damping vibrations are caused mainly in accordance with the spring/damping elements of the suspension and the elastic force of the tires.

On the other hand, when the vibrations are controlled, the driver's driv. force as shown in FIG. 8B, real driv. force as shown in FIG. 8C and driv. torque/reaction force as shown in FIG. 8D are immediately compensated in response to the accelerator operation as shown in FIG. 8A, thereby suppressing the vibrations such as the pitch angle of the vehicle body as shown in FIG. 8E and pitch rate as shown in FIG. 8F. Thus, the ground loads of the front and rear tires as shown in FIG. 8G and FIG. 8H, respectively, are stabilized as shown by the solid lines by removing the wave-like vibrations.

FIGS. 9A to 9H shows the vehicle vibrations under an input of only the travelling resistance (external disturbance). The controlled results are the same as FIGS. 8A to 8H. When the travelling resistance as shown in FIG. 9C is changed due to the road surface state or steering operation, the driv. torque/reaction force as shown in FIG. 9D, the pitch angle as shown in FIG. 9E, pitch rate as shown in FIG. 9F, ground load of the front wheel as shown in FIG. 9G and ground load of the rear wheel as shown in FIG. 9H show damping vibrations as shown by the dotted lines if the vibrations are not controlled.

On the other hand, when the vibrations are controlled, the damping vibrations of the pitch angle, pitch rate and ground load of the front and rear wheels as shown in FIGS. 9E to 9H, respectively, are suppressed.

According to the vibration control of the present invention, the real driving force as shown in FIG. 8C is gradually transferred to the tires, without suddenly be raised, when the accelerator pedal is stepped down. Therefore, the initial excessive slipping on a low-μ road is reduced and the gripping is rapidly recovered by the TRC operation. As a result, a process of the tire's approaching a gripping limit becomes extremely relaxed, whereby the driver can easily operate the accelerator pedal.

Further, according to the vibration control of the present invention, not only the fluctuations in pitch angle and pitch rate, but also the fluctuations in the wheel loads, are suppressed. This is explained by the Eqs. (22) and (23) expressing the front and rear wheel loads, Fzf and Fzr, respectively, as shown in FIG. 29.

Fzf as well as Fzr is a summation of a force applied on the shock absorber in the on-spring two-wheel model and anti-squat/anti-dive forces on the basis of the suspension geometry. It is understood by Eqs. (22) and (23) that the suppression of the on-spring vibration such as the pitching motion causes the suppression of the change in the ground load. In general, the longitudinal force of tires and lateral force of the tires are closely related with the ground load in such a manner that the longitudinal forces increase and decrease as the ground loads increase and decrease and those forces are saturated as the ground roads are raised up to a certain level. Therefore, the longitudinal and lateral motions are stabilized by the suppression of the changes in the longitudinal/lateral forces, when the ground load is suppressed.

As a result, a process of the tire's loosing a gripping becomes relaxed, whereby the driver can easily have a control of driving the vehicle including steering operation. Accordingly, even if the tires approach the gripping limit, TRC/VDC control is smoothly executed.

Although the control of the vibrations due to the driving force and external disturbance was explained above, a braking torque TbDrv (front wheel braking torque Tbf; rear wheel braking torque Tbr) requested by the driver may also be taken into consideration, thereby supplying the on-spring two-wheel model with the driv. and brak. force corresponding to the reaction force from the road surface. Thus, the calculated on-spring motion becomes a far more realistic approximation of a motion of an actually travelling vehicle. Accordingly, the vibration is controlled by the compensation of the driving force by the feed-back.

Figure 10:
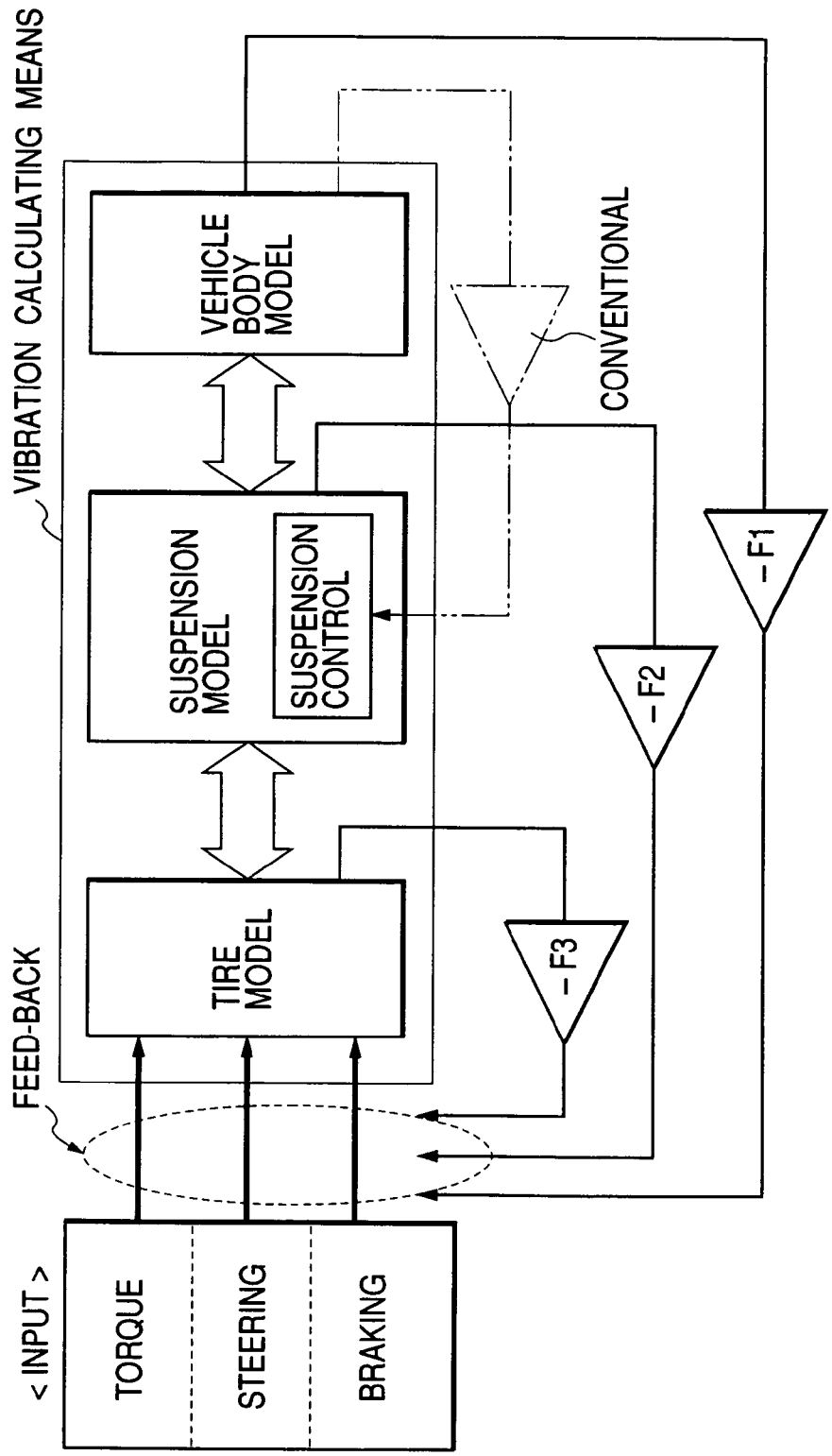
FIG. 10 is a block diagram of the vibration calculating means (kinetic model) together with the compensating means.

FIG. 10 is a block diagram of the vibration calculating means (kinetic model) together with the compensating means of the present invention.

The kinetic model (vibration calculation means) of the present invention includes: a tire model for calculating a tire vibration due to a road surface reaction force; a suspension model for calculating an under-spring vibration of a suspension; a vehicle body model for calculating an on-spring vibration of a vehicle body. The inputs are compensated in order to reduce the vibrations, giving priority to the vehicle body model. As shown in FIG. 10, the highest priority is given to the negative feed-back (−F1) from the vehicle body model, the second highest priority is given to the negative feed-back (−F2) from the suspension model and the lowest priority is given to the negative feed-back (−F3) from the tire model.

Here, the tire model, suspension model and vehicle body model are connected in series, thereby constructing a united kinetic model. Due to the united kinetic model of the present invention, the tire vibration due to a change in the engine output is first absorbed by the suspension. Next, a residual vibration which cannot be absorbed by the suspension is transferred to the vehicle body. Then, those vibrations are suppressed by three feed-back loops between the input of the tire model and outputs of the above-mentioned three models incorporated in the kinetic model.

Conventionally, only the suspension was controlled in order to suppress the vehicle body vibration, as shown in FIG. 10. However, the present invention clarified origins of the vehicle vibrations, thereby reaching the above-mentioned unified kinetic model.

The braking force may be controlled by Tb (=TwStab+(TwStab−TdEst)), where TwStab is a compensated torque and TdEst (=TtmEst×Nd) is a estimated torque from the driving source.

The driving force TtmStab as compensated by the feedback is expressed by Eq.(24) as shown in FIG. 30, by using a linear combination of a transfer function G (s) and H (s). Here, as shown in Eq. (24), a part of the compensated TtmStab wherein the quantity of state of the on-spring two wheel model is fed back is approximated by a filter (for lowering the gain around the resonance point of the on-spring vibration) of which transfer function is G (s) and another part of the compensated TtmStab for reducing the vibration caused by the drag due to the steering is approximated by a filter (for raising the gain around the resonance point of the on-spring vibration) of which transfer function is H (s).

According to the compensation by the calculated TtmStab, the sudden change in the driving force is compensated in such a manner that the change is maintained or suppressed, and the driving force is gradually converged to a value equivalent with the input. Further, when the steering is turned in one direction, the driving force is increased, while when the steering is turned in one direction and then the other, the driving force is decreased. Those compensation is executed on the bais of the on-spring characteristics. Thus, the pitching motion caused by the accelerator operation and steering operation and further a complex vibration due to the pitching and rolling motions are effectively reduced.

What is claimed is:

1. A vehicle vibration control apparatus, comprising:
   a driver's operation detecting unit configured to detect operation quantities of an accelerator, a steering wheel and a brake of a vehicle inputted by a driver as a driver's input indicating the operation quantities;
   a force calculator which calculates a driver-requested driving force and a driver-requested braking force of a vehicle in accordance with the driver's input;
   a vibration calculator which calculates, from the driver-requested driving force and the driver-requested braking force calculated in the force calculator, an on-spring vibration denoting vibrations of a body of the vehicle caused by the driver's input; and
   a compensator configured to compensate the driver-requested driving force according to the on-spring vibration calculated by the vibration calculator to produce a compensated driving force such that the on-spring vibration denoting vibration of the body of the vehicle is reduced or suppressed to a compensated on-spring vibration.

2. The vehicle vibration control apparatus according to claim 1, wherein:
   said vibration calculator comprises:
      a tire model for calculating a tire vibration caused by a road surface reaction force,
      a suspension model for calculating an under-spring vibration of a suspension of the vehicle, and
      a vehicle model which performs the calculation in said vibration calculator of said on-spring vibration denoting vibrations of said body of said vehicle caused by the driver's input; and
   said compensator compensates the driver-requested driving force in order to reduce the vibrations, giving priority to said vehicle model to give a top priority to the reduction of the on-spring vibration.

3. The vehicle vibration control apparatus according to claim 1, wherein:
   said compensator compensates the driver-requested driving force in order to reduce a vibration caused by a torque or reaction force due to an external factor outside said vehicle.

4. The vehicle vibration control apparatus according to claim 2, wherein the driver-requested driving force and the driver-requested braking force are inputted into said tire model which is connected with an input of said suspension model which is connected with said vehicle model, and the tire vibration in said tire model, the under-spring vibration in said suspension model and the on-spring vibration in said vehicle model are calculated in that order.

5. The vehicle vibration control apparatus according to claim 1, wherein:
   said compensator compensates the driver-requested driving force in order to reduce vibrations caused by a torque or reaction force due to an external factor outside said vehicle and the driver's input.

6. The vehicle vibration control apparatus according to claim 1, wherein said compensator compensates the driver-requested driving force in order to reduce a displacement of the center of gravity of said vehicle body.

7. The vehicle vibration control apparatus according to claim 1, wherein said compensator compensates the driver-requested driving force in order to reduce a displacement of a head position of a passenger.

8. The vehicle vibration control apparatus according to claim 1, wherein said vibration calculator calculates a tire vibration caused by the driver-requested driving force and the driver-requested braking force, an under-spring vibration caused by the tire vibration and the on-spring vibration caused by the under-spring vibration in that order, said compensator compensates the driver-requested driving force in order to reduce the on-spring vibration at a top priority, the under-spring vibration at a second priority, and the tire vibration at a lowest priority.

9. The vehicle vibration control apparatus according to claim 1, wherein the driver's operation detecting unit is configured to detect, as the driver's input, at least one of a set down stroke of an accelerator pedal, a set down stroke of a brake pedal, a turning angle of a steering wheel, a throttle state, and a brake master cylinder pressure.

10. The vehicle vibration control apparatus according to claim 1, wherein the on-spring vibration of the body of the vehicle has a frequency ranging from 1 Hertz to 2 Hertz.

11. The vehicle vibration control apparatus according to claim 1, the on-spring vibration of the body of the vehicle being caused due to a pitching motion of the body of the vehicle denoting rotation of the vehicle body around a pitch axis.

12. The vehicle vibration control apparatus according to claim 1, the on-spring vibration of the body of the vehicle being caused due to a transverse motion of the vehicle body.

13. The vehicle vibration control apparatus according to claim 1, the on-spring vibration of the body of the vehicle being caused due to a drag which is an action force generated by a tire of the vehicle during a steering operation and acted along a direction reverse to a moving direction of the vehicle.

14. The vehicle vibration control apparatus according to claim 1, the on-spring vibration of the body of the vehicle being caused due to a rolling motion of the vehicle body.

15. The vehicle vibration control apparatus according to claim 1, the vibration calculator performing said calculation of the on-spring vibration according to a vehicle model for modeling the on-spring vibration, and the vehicle model further calculating a direction of motion of a center of gravity of the body of the vehicle.

16. The vehicle vibration control apparatus according to claim 1,
the on-spring vibration of the body of the vehicle being caused due to a transverse motion of the vehicle body,
the on-spring vibration of the body of the vehicle being caused due to a drag which is an action force generated by a tire of the vehicle during a steering operation and acted along a direction reverse to a moving direction of the vehicle, and
wherein the on-spring vibration of the body of the vehicle being caused due to a rolling motion of the vehicle body.

17. The vehicle vibration control apparatus according to claim 1, the driver-requested driving force being inputted by the driver by operating the accelerator of the vehicle.

18. The vehicle vibration control apparatus according to claim 1, wherein the vehicle has a plurality of wheels, and the vibration calculator calculates a tire vibration caused by a road surface reaction force, transferred from a road surface through a plurality of tires of the wheels of the vehicle, from the driver-requested driving force and the driver-requested braking force calculated in the force calculator, calculates an under-spring vibration of a suspension of the vehicle caused by the tire vibration, and calculates the on-spring vibration caused by the under-spring vibration.

19. The vehicle vibration control apparatus according to claim 1, wherein the vibration calculator has a vibration estimating unit that estimates the on-spring vibration.

20. The vehicle vibration control apparatus according to claim 1, wherein the vehicle has a plurality of wheels, the vibration calculator has a vibration estimating unit that estimates a tire vibration caused by a road surface reaction force, transferred from a road surface through a plurality of tires of the wheels of the vehicle, from the driver-requested driving force and the driver-requested braking force, estimates an under-spring vibration of a suspension of the vehicle caused by the tire vibration, and estimates the on-spring vibration caused by the under-spring vibration.

* * * * *